UNITED STATES PATENT OFFICE 1,998,878

PROCESS FOR THE PRODUCTION OF ETHYLENE OXIDE

Théodore Emile Lefort, Paris, France, assignor to Société Anonyme; Societe Francaise de Catalyse Generalisee, Paris, France No Drawing. Application March 22, 1932, Serial No. 600,578. In France March 27, 1931

7 Claims. (Cl. 260—156.5)

This invention has for object a process for the production of ethylene oxide which mainly consists in subjecting ethylene to the simultaneous action of the oxygen of air and of water, in presence of a catalyzer and, if need be, of hydrogen.

Hydrogen, in case it is employed, in contact with the catalyzer, probably plays the part of an agent for accelerating the reaction which can be written as follows:

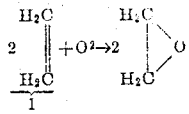

This reaction takes place at atmospheric pressure but, for commercially carrying the said process into practice, pressure can be employed, for instance a pressure of 50 kilograms per square centimeter, at a temperature between 150 and 400° C.

The following catalyzers may be used:

(1) A mixture of antimony, bismuth, silver, lead, arsenic, nickel and tin, in variable proportions.

(2) Silver alone.

(3) Silver activated by introducing therein small proportions of gold, copper or iron.

(4) The metals: gold, copper, iron, separately or in admixture and in any proportions.

(5) Silver alone, bismuth alone and antimony alone.

(6) The following mixtures:

Silver, gold, copper, iron\
Silver, gold, copper\
Silver, gold\
Silver, copper, iron    } in any proportions\
Silver, copper\
Silver, iron\
Copper, iron (7) The mixtures of antimony, lead, nickel and silver.

(8) The mixtures of bismuth, nickel, silver and lead.

(9) The mixtures of antimony, bismuth, nickel.

(10) The mixtures of antimony, bismuth, silver.

(11) The mixtures of bismuth and nickel.

(12) The mixtures of bismuth and silver.

And, generally speaking, all the mixtures which can be obtained with the following metals: antimony, lead, bismuth, silver, nickel, tin, arsenic, gold, copper, iron, taken separately, taken two by two, three by three, four by four, etc. ... in variable proportions, the mixtures, in the same conditions, of these metals with their oxides, the mixtures of the oxides alone of these metals, in the same conditions.

The ethylene can be obtained from any source of supply: gas from coke ovens, hydrogenation of acetylene, dehydration of ethyl alcohol, and the like.

Water can be admitted in the reaction vessel, either in the liquid state, or as steam.

The oxygen can be the oxygen of the air, this latter gas being introduced in the reaction.

The efficiency of the reaction is increased by diminishing the $CO_2$ which is formed, by introduction, in this reaction, of a suitable quantity of water. A suitable volume of $CO_2$ can also be previously introduced in the reacting gases.

For increasing the yield in ethylene oxide, the process can also be carried out under a pressure lower than atmospheric pressure.

Experiments have shown that silver could be activated by introducing, in this body, small quantities either of gold, or of copper, or of iron.

Thus, a mixture containing silver, gold, copper and iron, gives very satisfactory results and allows a specific reaction; the only foreign product obtained in the reaction is $CO_2$ which can be easily removed. Aldehydes formed exist only as traces.

Moreover, the applicant has found that the reaction giving $CO_2$ is, contrarily to previous belief, a reaction of oxidation independent from that giving ethylene oxide and from that giving aldehydes. From experiments effected by the applicant, it results that, if water is introduced in suitable quantity, the reaction is not only facilitated, as above stated, but, in addition, the reaction giving $CO_2$, probably by direct oxidation of ethylene according to the equation:

$$C_2H_4 + 3O_2 = 2H_2O + 2CO_2$$

is checked, owing, as is probable, to the partial pressure of water. From these experiments, it can be concluded that if a certain quantity of $CO_2$ is previously introduced, in addition, in the reacting gases, the partial pressure of $CO_2$ will produce its effect, and the reaction of oxidation of ethylene into $CO_2$ will be completely checked resulting in a considerable increase in the efficiency of the operation. Moreover, it is to be noted that, when the synthetic operation is effected under partial vacuum, the yield in ethylene oxide is increased.

Several modi operandi for carrying the process into practice, will be indicated hereinafter, by way of example only.

Modus operandi I

In a plant constructed for resisting to high pressures, ethylene on the one hand, and air on the other hand, are separately compressed by means of suitable compressors.

The mixture of air and ethylene can also be compressed by taking the necessary precautions in order to avoid the risk of explosion.

These two gases will be led, together with hydrogen or not, into a reaction tube resisting to the pressure of several hundreds of kilograms, containing one of the catalyzers indicated above, and heated, for instance, to a temperature of 200° C. This tube communicated moreover with a circulating pump allowing to introduce water under pressure.

The reaction will take place in this tube between ethylene, the oxygen of air, and water. By controlling the outputs, a continuous operation will be obtained. Ethylene oxide thus formed will be separated from the other gases, for instance, by condensation.

Modus operandi II

Silver in powder form, or in the form of a wire gauze, and placed or not on a support or carrier, is introduced in a tube, made for instance of silica, and, after the said tube has been heated to a temperature comprised between 150 and 400° C., a mixture of ethylene, air, water vapour, and hydrogen is caused to pass therethrough. The proportion of hydrogen is about 5% of the total mixture. The ethylene oxide produced can be separated from the gases issuing from the tube.

Modus operandi III

A silver colloid is introduced in a high pressure tube which has been filled with water. Pure ethylene under pressure is then added in order that it can dissolve in the water.

The tube is subsequently heated between 150 and 400° C., then air and hydrogen are slowly introduced. The introduction of air is stopped when the totality of ethylene is converted into ethylene oxide.

From ethylene oxide produced according to the processes which have been indicated above, it is possible to obtain, by simple saponification, ethylene-glycol, or by other known methods, any derivative of ethylene-glycol.

The reaction, for obtaining ethylene-glycol, can be written as follows:

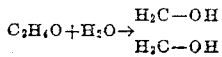

The experiments effected by the applicant have shown that, in presence of the catalyzers indicated, water, in the form of steam or not, considerably promotes the reaction ensuring the production of ethylene oxide.

What I claim as my invention and desire to secure by Letters Patent is:

1. A process for the production of ethylene oxide, consisting in subjecting ethylene to the simultaneous action of oxygen and water, in presence of a catalyst, constituted by silver activated by introducing in the body small quantities of a metal selected from a group consisting of gold, copper, and iron, at a temperature between 150 and 400° C.

2. A process for the production of ethylene oxide, consisting in subjecting ethylene to the simultaneous action of the oxygen and water, in presence of a catalyst, constituted by a mixture of silver, gold, copper and iron, at a temperature between 150 and 400 degrees C.

3. A process for the production of ethylene oxide, consisting in subjecting ethylene to the simultaneous action of oxygen and water, in presence of a catalyst constituted by a mixture of silver and gold, at a temperature between 150 and 400° C.

4. A process for the production of ethylene oxide consisting in subjecting ethylene to the simultaneous action of oxygen and steam, in presence of a catalyst constituted by a metal selected from a group consisting of silver, gold, copper and iron, and hydrogen in the proportion of 5 per cent of the total volume, at a temperature between 150 and 400 degrees C., and at a pressure below atmospheric pressure.

5. A process for the production of ethylene oxide consisting in subjecting ethylene to the simultaneous action of oxygen and steam, in presence of a catalyst constituted by a metal selected from a group consisting of silver, gold, copper and iron, and hydrogen in the proportion of 5 per cent of the total volume, and $CO_2$, and at a pressure below atmospheric pressure.

6. A process for the production of ethylene oxide, consisting in subjecting ethylene to the simultaneous action of oxygen, steam and hydrogen in presence of a catalyst constituted by silver activated with small quantities of gold, at a temperature between 150 and 400 degrees C.

7. A process for the production of ethylene oxide, consisting in subjecting ethylene to the simultaneous action of oxygen, steam and hydrogen in presence of a catalyst constituted by silver activated with small quantities of a mixture of gold and copper at a temperature between 150 and 400 degrees C.

THÉODORE EMILE LEFORT.